United States Patent [19]

Warden

[11] Patent Number: 5,417,511
[45] Date of Patent: May 23, 1995

[54] RELEASABLE LOCK FOR TELESCOPING MEMBERS

[76] Inventor: Roland R. Warden, 301 S. Evergreen, Wichita, Sedgwick County, Kans. 67209

[21] Appl. No.: 103,551

[22] Filed: Aug. 9, 1993

[51] Int. Cl.⁶ .............................................. F16B 7/10
[52] U.S. Cl. .................................. 403/109; 403/350; 403/351; 403/365; 403/366; 403/367; 403/377
[58] Field of Search ............... 403/109, 110, 350, 351, 403/365, 366, 367, 377, 376

[56] References Cited

U.S. PATENT DOCUMENTS

| | | | |
|---|---|---|---|
| 2,517,700 | 8/1950 | Odin | 403/367 |
| 2,546,157 | 3/1951 | Hume | 403/351 |
| 2,850,308 | 9/1958 | Le Febvre et al. | 403/367 |
| 3,170,721 | 2/1965 | Well et al. | 403/377 |
| 3,515,418 | 6/1970 | Nielsen, Jr. | 403/377 |
| 3,603,623 | 9/1971 | Widman | 403/377 |
| 3,724,885 | 4/1973 | Becker | 403/351 |
| 3,942,826 | 3/1976 | Lester | 403/350 |
| 4,076,437 | 2/1978 | Mazzolla | 403/350 |
| 4,154,545 | 5/1979 | Pinto et al. | 403/350 |
| 4,294,560 | 10/1981 | Larkin | 403/351 |
| 4,324,502 | 4/1982 | Pickles | 403/351 |
| 4,419,026 | 12/1983 | Leto | 403/351 |
| 4,619,548 | 10/1986 | Kazaoka et al. | 403/377 |
| 4,632,597 | 12/1986 | Clausen et al. | 403/351 |
| 5,011,319 | 4/1991 | Levi et al. | 403/351 |

FOREIGN PATENT DOCUMENTS

| | | | |
|---|---|---|---|
| 2504995 | 11/1982 | France | 403/377 |
| 3900797 | 11/1989 | Germany | 403/350 |

Primary Examiner—Richard A. Bertsch
Assistant Examiner—Howard R. Richman
Attorney, Agent, or Firm—Don M. Bradley; Shook, Hardy & Bacon

[57] ABSTRACT

A locking device for releasably securing a pair of members in relatively telescoped relationship is disclosed. The device comprises a body to be attached to the end of one member and having an internal bore to receive the other member. The body has a deflectable holding element to frictionally engage against a member to lock it against relative telescoping movement. A projection carried by a rotatable eccentric is moved into and out of engagement with the element to lock or release the members depending on the direction the eccentric is rotated.

3 Claims, 2 Drawing Sheets

5,417,511

RELEASABLE LOCK FOR TELESCOPING MEMBERS

FIELD OF THE INVENTION

This invention relates to a locking device for telescoping members, and more particularly, to a locking device for releasably securing two telescoping members in any selected relatively telescoped condition.

BACKGROUND OF TEE INVENTION

Telescoping members are commonly used as a means for providing adjustability for a variety of applications. Telescoping legs are known for use with camera tripods and the like. They are likewise known for use as elongated handles to permit items such as ceiling painting apparatuses or light bulb changers to be manipulated at locations which would otherwise be beyond the reach of the operator.

A common problem associated with telescoping members has been the relatively expensive and sometimes cumbersome locks which are used to hold the telescoping members in a longitudinally fixed relationship after the telescoping members are adjusted to the desired length. Sometimes means used for this purpose have involved a plurality of pairs of transversely aligned holes along the longitudinal sidewall of the first telescoping member, and a pair of corresponding transversely aligned holes in the second telescoping member. As the two telescoping members are moved longitudinally with respect to each other, one of the pairs of aligned holes of the first telescoping members aligns with the pair of holes from the second telescoping member. Typically, a bolt or securing pin is received through the aligned pairs of holes to secure the first and second telescoping members in fixed telescoped position.

Nevertheless, it is often difficult to adjust the length of members provided with this type of fastening means. A user must align the appropriate holes and reinsert the pin at the chosen location. Two hands are often required and several "trial and error" efforts may be necessary. The tolerances provided between the holes and the pin frequently ensure that the point where the members are secured together will be loose and are likely to result in considerable undesirable "play" between the members at this location.

Another approach to releasably locking relatively telescoped members involves compressing an outer tubular member against the inner member at the entrance end of the outer member. The outer tube has longitudinal slots to permit the tube to be squeezed to a smaller effective diameter. The threaded outer surface of the outer member adjacent the joint is tapered and receives a threaded nut which may be manually manipulated up and down the threads to tighten or loosen the compressive force on the inner member. This fastening means is expensive because of the machining required to present the threaded taper. Further, it usually requires a number of turns of the nut to move the lock from its fully closed to its fully open position. Only the outermost tips of segments defined by the slots bear against the inner member, making the fastening inherently relatively weak.

OBJECTS AND SUMMARY OF THE INVENTION

It is therefore a primary object of the present invention to provide a releasable locking device for more effectively securing two telescoping members in any selected fixed longitudinal relation. To this end, an object is to provide such a locking device which allows operation of a novel eccentric structure to deflect an element into frictional engagement with one of the telescoping members to hold the telescoping members in fixed longitudinal relation. Moreover, an object is to provide such a lock which furnishes a relatively large surface area of contact against one of the telescoping members to effect a relatively large holding force for maintaining the telescoping members in fixed relation.

Another important objective is to provide a releasable locking device which securely maintains the telescoping members in fixed relation, but which simplifies the steps or actions required by a user to secure and release the telescoping members. More specifically, it is an object to provide a novel rotatable eccentric activating structure so that operation of the locking device may be achieved by slightly rotating the eccentric structure to secure and release the telescoping members.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE PREFERRED EMBODIMENTS

Figure 1:
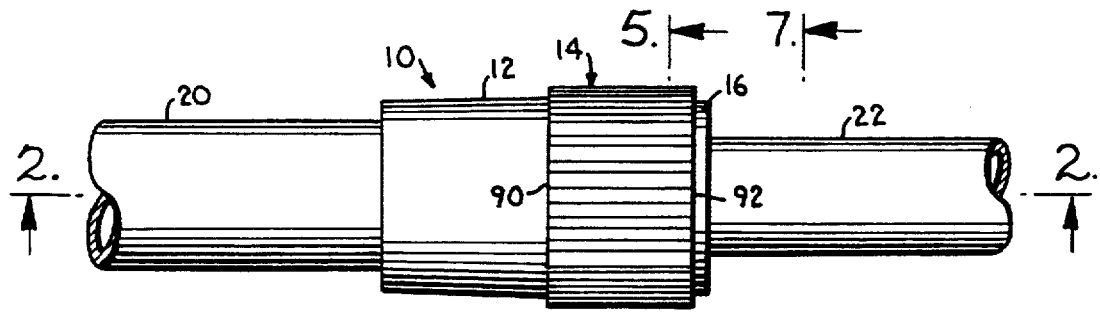
FIG. 1 is a side elevational view of the locking device embodying the present invention, showing a pair of telescoping members fragmentally.

Referring initially to FIG. 1, the locking device constructed according to a preferred embodiment of the present invention is designated generally 10. The locking device 10 comprises a base 12, an eccentric structure, such as collar 14 and a retention ring 16 (the separated members being shown best in the exploded views in FIGS. 3 and 4).

Figure 2:
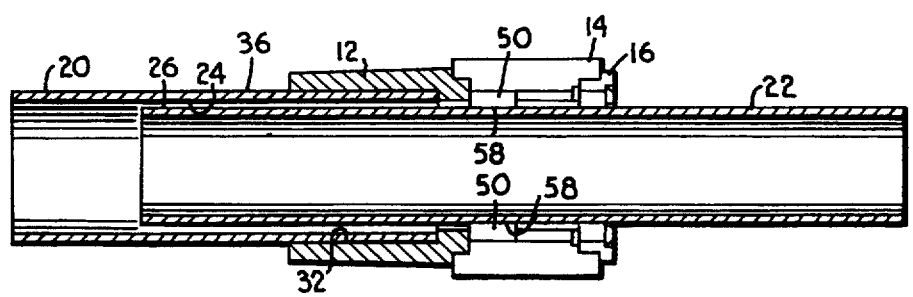
FIG. 2 is a cross sectional view taken along line 2—2 in FIG. 1.

As shown best in FIG. 2, the locking device 10 is adapted to releasably secure a first telescoping member 20 and a second telescoping member 22 in relatively telescoped disposition along a longitudinal axis. As is well known, the first telescoping member 20 has an inside diameter, defined by inner sidewall 24, sized to receive the outside diameter of the second telescoping member 22, defined by outer sidewall 26. Thus, the second member is adapted to be telescopically received within the first member. The locking device 10 is movable between an open position in which the second member can be longitudinally adjusted within the first member, and a closed position in which the locking device releasably secures the first and second members in fixed telescoped relationship.

The base 12 has an annular recess 30 defined by a cylindrical sidewall portion 32 and an annular ridge 34. The annular recess 30 is sized to snugly receive the outer sidewall 36 of the first telescoping member 20. Member 20 is rigidly secured to sidewall 32 within recess 30 by known means, such as epoxy or the like. The recess should be sufficiently long to securely and rigidly couple the first telescoping member 20 to base 12.

Base 12 has an outside wall 40 comprising a substantially cylindrical outer wall 42, a first portion of reduced diameter 44 having an end wall 46 of still further reduced diameter. The portion 44 and wall 46 are adapted to mate with the collar 14, as will be described below. The end portion 48 comprises a cylindrical sleeve 50, a pair of opposed arms 52 and 54 integral with sleeve 50 and cantilevered therefrom, and a deflection element 56. The cylindrical sleeve 50 includes an inner bore 58 (FIG. 2) which is sized to telescopically receive the second telescoping member 22. Arms 52 and 54 extend longitudinally outwardly from sleeve 50, and are diametrically opposed from one another. Arms 52 and 54 also carry at their outermost ends projections 60 and 62, respectively.

Figure 3:
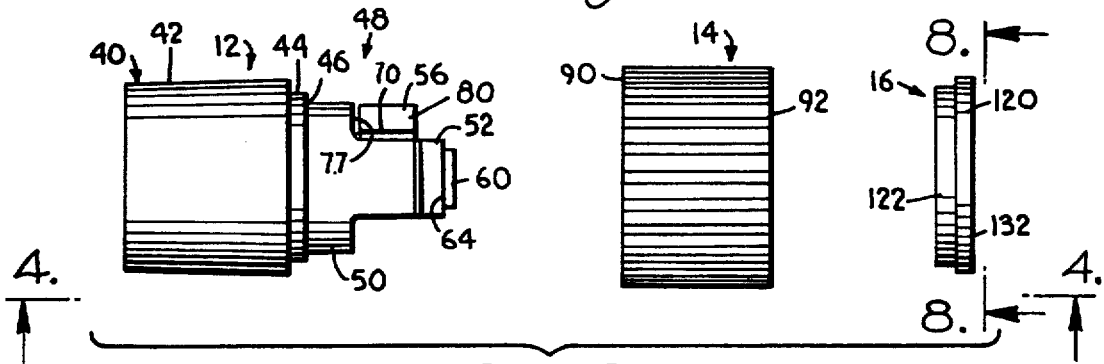
FIG. 3 is an exploded view of the locking device.
Figure 4:
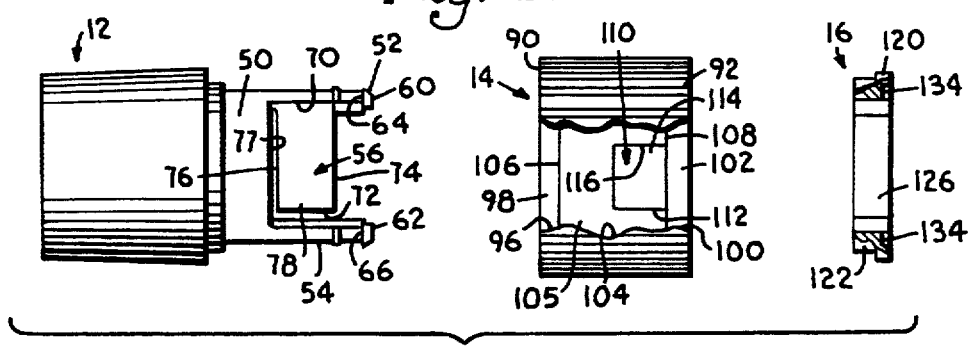
FIG. 4 is a view similar to FIG. 3, but showing the components rotated ninety (90) degrees on their longitudinal axes, parts being cut away to reveal details of construction.

Deflectable element 56 is resiliently and rotatably carried by arm 52 for movement about a longitudinal axis substantially parallel to the longitudinal axis of the base. Element 56 is adapted to be engaged by the eccentric structure of collar 14 to move the element radially inwardly with respect to the longitudinal axis of the base 12. Element 56 is integral at one end 70 with arm 52 and curves around to a free distal end 72. The deflectable element further has a right side 74 (as seen in FIGS. 3 and 4), and a left side 76 separated from the end of cylindrical sleeve 50 by a slot 77. Element 56 also has an inner surface 78 and an outer surface 80. The area of inner surface 78 of element 56 affects the amount of frictional force which can be achieved between the inner surface of the element and the outer sidewall 26 of member 22. This affects the holding force which can be exerted by the locking device, as will be subsequently explained. It should be understood that the dimensions of the element should be chosen as necessary to provide the holding force required of the locking device to accommodate the securing of whatever sized members may be involved.

Figure 5:
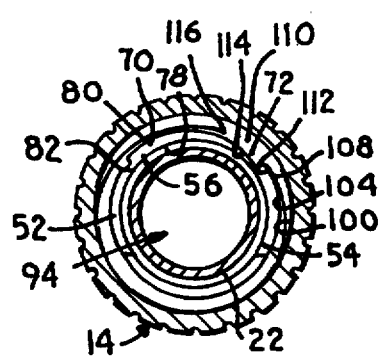
FIG. 5 is a cross sectional view taken along line 5—5 in FIG. 1, showing the locking device in the open position to allow relative telescoping.
Figure 6:
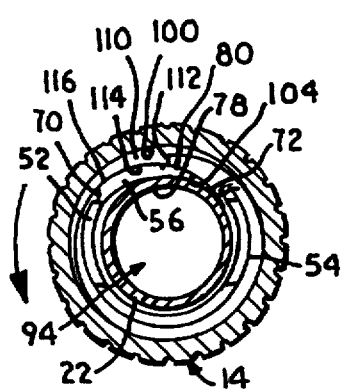
FIG. 6 is a view similar to FIG. 5, showing the locking device in the closed position locking the members against relative telescoping movement.

Referring to FIG. 5, when the locking device 10 is in the open position, and thus the deflectable element is not engaged by the collar 14, the inner surface 78 of deflectable element 56 is generally concentric with the wall of bore 58 of sleeve 50. The curved outer surface 80 tapers from its proximal end 70 to its distal end 72 such that the thickness of the deflectable element decreases as its distal end is approached. The surface 80 extends eccentrically to bore 58. A longitudinally extending notch 82 in surface 80 at the zone of connection of element 56 to arm 52 weakens the element at its base, rendering the element more flexible and less resistant to deflection. As shown in FIG. 6, and as will be discussed in greater detail below, element 56 is adapted to be engaged by the eccentric structure of collar 14 to cause element 56 to deflect radially inwardly to effect a clamping force against the second telescoping member 22.

Figure 7:
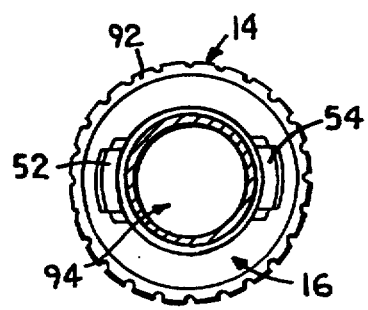
FIG. 7 is a cross sectional view taken along line 7—7 in FIG. 1.

Collar 14 has a first end 90 and a second end 92, and has a generally transverse circular cross section having a bore 94, as shown in FIGS. 5-7, for receiving the portion 48 of base 12, as will be described in greater detail below. Referring to FIG. 4, bore 94 includes three distinct bore sections comprising the inner surface of collar 14. A bore section 96 is defined by the surface 98 adjacent the first end 90 of collar 14. A bore section 100 is formed by the surface 102 adjacent the second end 92 of collar 14. The bore sections 96 and 100 are sized substantially identically and have longitudinal axes which are concentric with the longitudinal axis of the bore 58 of sleeve 50. The collar 14 further includes an eccentric bore 104 formed by a cylindrical surface 105 defined between annular shoulders 106 and 108 and which is eccentric to sleeve bore 58. The eccentric bore 104 has a longitudinal axis which is eccentric to the longitudinal axis of bores 96 and 100, as well as to bore 58 of sleeve 50, as best shown in FIGS. 5 and 6.

An inwardly protruding projection 110 is carried by the eccentrically extending surface 105 of eccentric bore 104, as shown in FIGS. 4-6. The projection 110 is formed on the eccentric surface 105 and presents a shoulder 112 which extends radially inwardly from the eccentric surface 105. Projection 110 has an innermost surface 114 which curves downwardly from shoulder 112 to a shoulder 116 at the opposite end of the projection and which projects only a relatively short distance inwardly from the eccentric surface 105 of eccentric bore 104. As shown in FIGS. 5 and 6, the curved surface 114 of projection 110 extends eccentrically both to surface 105 and to the outer surface 80 of deflectable element 56 and is disposed to slidably engage the curved outer surface 80 when collar 14 is rotated.

The shoulder 106, surface 98, and first end 90 of collar 14 are adapted to mate with the portion 44 and wall 46 of the base 12. This rotatably mounts the collar on the base and holds the collar against longitudinal movement in the direction of the first telescoping member 20. Longitudinal movement of the collar 14 in the opposite direction is prevented by a retention ring 16 which restricts movement of the collar to mere rotation about the longitudinal axis of the base.

Referring to FIGS. 5 and 6, the locking device 10 is moveable between an unlocked position (shown in FIG. 5) in which the second telescoping member can be longitudinally adjusted with respect to the first telescoping member 20 to vary the combined length, and a closed position (shown in FIG. 6) in which the telescoping members are secured in fixed relatively telescoped disposition. In the open position, the projection 110 does not engage the deflectable element 56 and the inner surface 78 of the deflection element 56 remains generally concentric with the bore 58 of the sleeve 50 of base 12. In this position, the second telescoping member 22 is free to slide longitudinally with respect to the first telescoping member 20.

As collar 14 is rotated in a counterclockwise direction, as shown by the arrow in FIG. 6, projection 110 engages deflectable element 56 thereby deflecting it radially inwardly to effect a clamping force upon the second telescoping member 22. The eccentrically disposed surface 105 of bore segment 104 and the opposing curved surfaces 80 and 114 of different radii of curvature (shown in FIGS. 5 and 6) cause the degree of deflection of element 56 to gradually increase as projection 110 is moved in the counterclockwise direction. Referring again to FIGS. 5 and 6, collar 14 requires less than a half turn to change locking device 10 from its fully open position (shown in FIG. 5) to its fully closed or locked position (shown in FIG. 6). Deflectable element 56 is resiliently integral with arm 52, and it automatically returns to its radially outward position with its inner surface 78 concentric with the surface of bore 58 when the locking device is rotated from the closed position to the open position.

Figure 8:
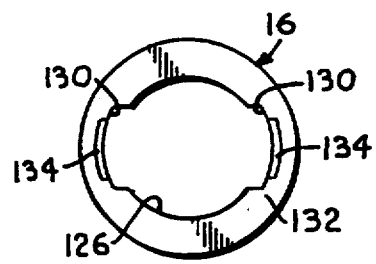
FIG. 8 is an elevational view of the ring which secures the eccentric structure to the base.

Retention ring 16 has a circular opening 126 therethrough adapted to receive telescoping member 22. A pair of opposed, identical, elongated notches 130 communicate with opening 126 as shown in FIG. 8. Recesses 134 in the end surface 132 of ring 16 are provided for each notch 130 in communication therewith and disposed to receive projections 60 and 62 carried on the outermost ends of arms 52 and 54, respectively. The latter are integral with base 12 and are resiliently cantilevered therefrom to permit ring 16 to be snapped into position over the arms. Removal of the ring, if desired, can be accomplished by deflecting the arms inwardly to move the projection from their respective recesses. Normally, however, the ring is held in position by the arms to limit collar 14 to rotation about the longitudinal axis of bore 32.

As shown best in FIGS. 3 and 4, ring 16 has an annular peripheral surface 120 and another annular surface 122 of reduced diameter. Surface 122 is adapted to slidably mate with the surface of bore segment 102 to cooperate with mating surfaces 98 and 44 to mount collar 14 for rotation on base 12.

OPERATION

With the locking device assembled as shown in FIGS. 1 and 2, the second telescoping member 22 projects through circular opening 126 and through the cylindrical bore 58 of sleeve 50, and thence within the first telescoping member 20, as shown in FIG. 2. Member 22 can be moved longitudinally within the first telescoping member to adjust the combined length of the members as may be desired. When the desired length is achieved, collar 14 can be rotated in a counter clockwise rotation, as shown in FIG. 6, until the projection 110 causes the deflectable element 56 to move radially inwardly to effect a frictional, clamping force against the second telescoping member. When element 56 is fully clamped against member 22, collar 14 can rotate no further in the counterclockwise direction. This locks the members in fixed telescoped relationship until the collar 14 is rotated in the clockwise direction. Such rotation permits element 56 to spring back to its normal position, thereby unlocking device 10. As can be seen, collar 14 need only be rotated less than half a turn to allow the projection member to move between the locked and unlocked positions, as shown in FIGS. 5 and 6.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A locking device for securing first and second elongated telescoping members in selected relative telescoped disposition, the device comprising:

a tubular base having a longitudinal axis and an axially extending opening through the base, the base being adapted to be fixed to one end of the first member with the second member extending through the opening and telescoping into the first member, there being an outer surface on said second member, said opening being defined by an annular surface extending around the outer surface of the second member;

said base being configured to present a resilient, deflectable element integral with the base and extending in cantilevered disposition circumferentially of the annular opening of the base, the element being movable radially inwardly from said annular opening defining surface to engage the outer surface of said second member, said element having a curved outermost surface;

a tubular collar having a bore therethrough disposed to receive the second member through the bore, said collar being rotatably mounted on the base for rotation about the axis of said opening;

a projection carried by the collar for rotation therewith, said projection having an inner inclined cam surface, the projection moving on a path of travel when the collar is rotated in one direction to engage the cam surface of the projection against the outermost surface of the element to deflect the element into frictional locking engagement against the outer surface of the second member.

2. A locking device as set forth in claim 1, wherein the curved outermost surface of the element is disposed eccentrically to the axis of rotation of the collar in disposition to enhance the inward displacement of the element when the projection is moved by rotation of the collar in said one direction, and to enhance the withdrawal of the projection from engagement with the element outer surface to remove said locking engagement when the collar is rotated in the opposite direction.

3. A locking device as set forth in claim 2, wherein the collar has an inwardly facing surface that extends eccentrically to the axis of rotation of the collar, the projection being carried by said eccentrically extending collar surface.

* * * * *